(12) United States Patent
Zwahlen et al.

(10) Patent No.: US 9,139,963 B2
(45) Date of Patent: Sep. 22, 2015

(54) PORTABLE SPREADER FOR SCATTERING GRANULAR MATERIALS (75) Inventors: Jürg Zwahlen, Triesen (LI); Rolf Bandhauer, Niedergosgen (CH)

(73) Assignee: Birchmeier Spruhtechnik AG, Stetten (CH)

( * ) Notice: Subject to any disclaimer, the term of this patent is extended or adjusted under 35 U.S.C. 154(b) by 347 days.

(21) Appl. No.: 13/700,428

(22) PCT Filed: May 4, 2011

(86) PCT No.: PCT/IB2011/051974
§ 371 (c)(1),
(2), (4) Date: Nov. 27, 2012

(87) PCT Pub. No.: WO2011/148284
PCT Pub. Date: Dec. 1, 2011

(65) Prior Publication Data
US 2013/0068861 A1   Mar. 21, 2013

(30) Foreign Application Priority Data

May 28, 2010   (CH) .......................................... 844/10

(51) Int. Cl.
*E01C 19/20* (2006.01)
*A01C 15/02* (2006.01)

(52) U.S. Cl.
CPC .............. *E01C 19/2005* (2013.01); *A01C 15/02* (2013.01)

(58) Field of Classification Search
CPC ................ E01C 19/2005; E01C 19/20; E01C 2019/206; A01C 15/02; A01C 7/02; B05B 7/1404; B65D 83/06

USPC .......... 239/668, 652, 653, 657, 658, 659, 689, 239/152, 154, 375–379; 222/196.1, 196.2, 222/202

See application file for complete search history.

(56) References Cited

U.S. PATENT DOCUMENTS 125,324 A  *  4/1872  Paine ............................ 239/652
429,454 A  *  6/1890  Keeney ......................... 239/652
(Continued)

FOREIGN PATENT DOCUMENTS

CH             193009 A          9/1937

OTHER PUBLICATIONS

Birchmeier Spruhtechnik AG, "Written Opinion of the International Searching Authority," Int'l Patent Application No. PCT/IB2011/051974, filed May 4, 2011.

*Primary Examiner* — Jason Boeckmann
(74) *Attorney, Agent, or Firm* — Janet Sleath; Speckman Law Group PLLC (57) ABSTRACT

The invention relates to a portable scattering apparatus (1) for storing and dispensing granular material, especially pourable bulk material on a surface, e.g. of grainy fertilizer on a lawn surface, or scattering material on slick roads or paths. The scattering apparatus (1) contains a closable container (3) and a handle part (2) connected to the container (3) for dispensing the granular material. The handle part (2) comprises a lock chamber (4) in the connecting region of the container (3) for controlling the flow rate, and it is shaped into a distributor (5) at the front end. A valve (25) is arranged in the lock chamber (4), which valve can be actuated via a lever (11), which is pivotably held on the outside on the handle part (2). The lever (11) is connected via a valve stem (28) with the valve disk (26) of the valve (25).

16 Claims, 4 Drawing Sheets

(56) References Cited

U.S. PATENT DOCUMENTS

| | | | |
|---|---|---|---|
| 1,274,696 A * | 8/1918 | Wirt | 33/342 |
| 1,469,118 A * | 9/1923 | Speicher | 239/652 |
| 2,337,952 A | 12/1943 | Whiten | |
| 2,355,732 A * | 8/1944 | Jepsen | 47/1.7 |
| 3,478,936 A * | 11/1969 | Farmery | 222/340 |
| 3,997,119 A * | 12/1976 | Oosterhof | 239/652 |
| 2006/0208009 A1* | 9/2006 | Young et al. | 222/536 |
| 2009/0072055 A1* | 3/2009 | Flanagan-Kent et al. | 239/664 |

* cited by examiner

PORTABLE SPREADER FOR SCATTERING GRANULAR MATERIALS

REFERENCE TO RELATED APPLICATIONS

This application is the US national phase entry of International Patent Application no. PCT/IB2011/051974, filed May 4, 2011, which claims priority to Swiss patent application no. 00844/10, filed May 28, 2010.

FIELD OF THE INVENTION

The invention relates to a portable scattering apparatus for storing and deploying granulate, especially pourable bulk material, onto an area such as grainy fertilizer on a lawn surface or grit on slick roads or pavements according to the preamble of claim 1.

BACKGROUND

Grainy fertilizer, seed or other bulk materials are delivered in boxes or bags. The user then needs to dispense the bulk material by hand or with simple tools such as a shovel on the ground to be covered. This leads to the problem that an even application can hardly be achieved. Furthermore, the dispensing of chemicals in the aforementioned manner also entails a certain likelihood of injury when said chemicals contain caustic or poisonous substances. Further problems arise from the difficulty of storing open boxes or bags in a secure and safe way and of protecting them from humidity for example.

In addition to larger motor-driven apparatuses, there are also hand-operated scattering devices, by means of which the scattering of bulk materials or chemicals is enabled. The German utility model G 93 20 160.5 proposes a scattering device for dispensing de-icing salt and the like onto ground areas, which device is characterized by the attachment of a handle to a conventional bottle. In accordance with the idea of this utility model, the user can convey scattering material from the bottle by holding it by its handle and ejecting said material with rapid movements all around. The advantage of this grip lug is that the user will not come into contact with the bulk material. However, even scattering can be achieved with said device only with difficulty.

The US publication U.S. Pat. No. 3,997,119 contains a further proposal for a solution. It discloses a device for scattering grainy substances, which device comprises a container and a delivery tube, which is connected thereto, and a distributor arranged at the end of the delivery tube. The distributor comprises a substantially flat plate, which is provided on the upper side with pins, which are arranged perpendicularly to the plate and distributed over the area of the plate. Granular material can be distributed with the device without coming into contact with the material. The disadvantage of the device is that the user needs to pivot the container and the granular material contained therein back and forth during scattering, which is relatively laborious and strenuous. Furthermore, it is difficult with this apparatus to evenly distribute the granular material.

The publication WO-A-2008-043191 discloses a portable scattering apparatus for storing and scattering granular material. It contains a container and a distributor for scattering the granular material. A tubular connection and a flow controller are arranged between the container and the distributor. One respective tubular section is arranged on the outlet openings of the distributor in such a way that the individual tubular sections are arranged to extend in a diverging manner away from the outlet opening. The disadvantage of this apparatus is the container on the one hand, which is difficult to refill and is unwieldy in handling. On the other hand, blockages may occur in the region of the flow control and in the flexible tubular section of the described scattering apparatus depending on the grain size of the scattering material. This means that this apparatus, depending on the configuration of the flow controller, can only be optimally used for specific grain sizes.

SUMMARY

The present invention is based on the object of providing a portable scattering apparatus, which eliminates the disadvantages of known portable apparatuses for scattering granular material.

This object is achieved by an apparatus comprising a closable container and a handle part connected to the container for dispensing the granular material, with the handle part comprising a lock chamber for regulating the flow in the connecting region of the container, and wherein the handle part is formed into a distributor at the front end, characterized in that a valve is arranged in the lock chamber, which valve can be actuated via a lever, with the lever being pivotably held on the outside on the handle part, and is connected via a vale stem with the valve disk of the valve.

Further advantages of the invention follow from the dependent claims and the description below, in which the individual components of the scattering apparatus will be described in detail and will be explained in closer detail by reference to an exemplary embodiment shown in the schematic drawings.

DETAILED DESCRIPTION OF DRAWINGS

The same reference numerals have been used in the drawings for the same elements and explanations made for the first time relate to all drawings, unless expressly mentioned otherwise.

Figure 1:
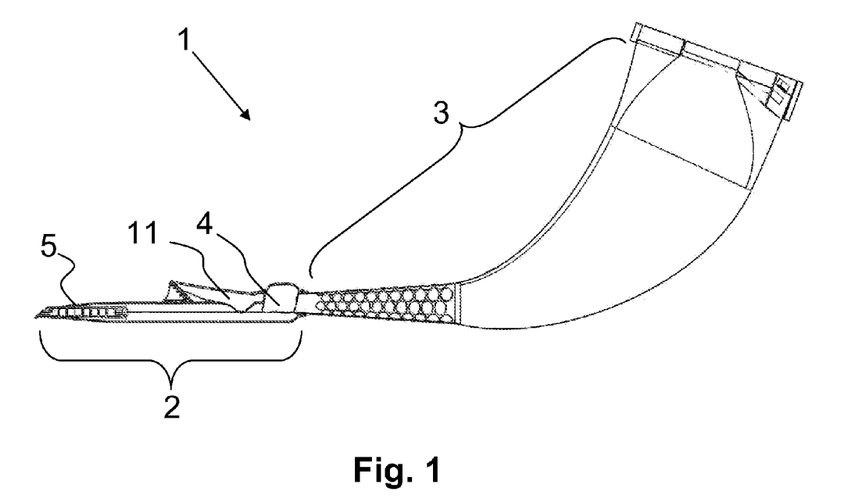
FIG. 1 shows a schematic representation of the apparatus for dispensing as seen from the side.

FIG. 1 shows a schematic view from the side of an exemplary embodiment of the portable scattering apparatus 1 in accordance with the invention for storing and dispensing granular material. Granular material shall mean any scattering or bulk material, which is pourable or flowable. In order to dispense the scattering material evenly, it not only requires the skill of the person operating the apparatus, but the individual components of the scattering apparatus 1 must also be adjusted to each other in such a way that even scattering of the scattering material is enabled. Even scattering of the scattering material shall mean that the scattering image on the scattering ground shows an even distribution of the scattering material. The scattering apparatus 1 substantially consists of two parts, which are a handle part 2 and a container 3. The closable container 3 is used for accommodating the scattering material and a handle part 2, which is connected to the container 3, allows the scattering of the granular material. A lock chamber 4 with a valve that can be actuated via a lever 11 is arranged in the handle part 2 directly after the connecting region of the container 3. The valve is used for controlling the flow rate. The other end of the handle part 2 is formed into a distributor 5 for the scattering material. When the scattering material is dispensed, the user carries the container 3 of the scattering apparatus with a strap arranged on the upper edge of the container 3 in the manner of a shoulder bag under an arm or in an oblique fashion over the back and holds the strap with one hand. The strap forms a loop, which the user can pull more or less with the one hand over his or her shoulder. The handle part 2 is held with the other hand. In this process, the longitudinal axis of the handle part 2 extends away from the container 3 slightly downwardly in the direction of the scattering ground, so that the scattering material, as a result of gravity, will flow or run from the container 3 in the direction towards the lock chamber 4 in the handle part 2 and into the distributor 5 when the valve is opened. As a result of even, horizontal and ejection-like movements with the handle part, the granular material is ejected from the distributor 5 and thereby applied evenly to the scattering ground. If the user wishes to hold the handle part 2 closer to the scattering ground in order to dispense a low amount of scattering material in a purposeful fashion at a specific location, he or she can slightly lift the hand that holds the loop and pull the handle part 2 in the direction towards the scattering ground with the other hand. If contrary thereto the handle part is to be guided closer to the body, the user will pull up the bag 6 by means of the loop 8. As a result, the user can always achieve the position of the portable device, which is optimal for the user or for the application. The dispensing of the granular material occurs without any major effort because the container and its content are carried with the shoulder strap and only the handle part 2 needs to be held by hand.

Figure 2:
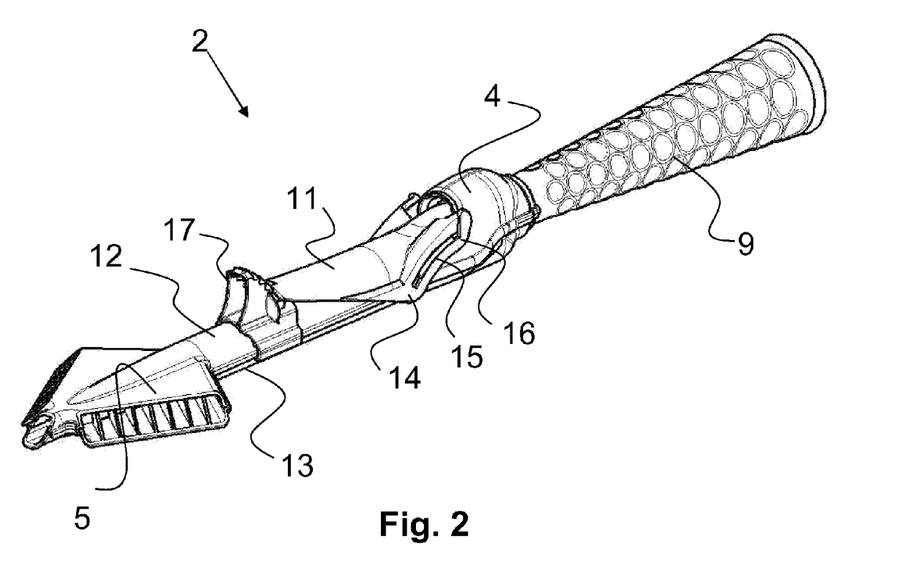
FIG. 2 shows a schematic representation of the handle part of the apparatus for dispensing granular material in an oblique view.

FIG. 2 shows the handle part 2 in a schematic representation. The handle part 2 is composed of an upper part 12 and a bottom part 13, and has a length of approximately 25 cm, but it can also be provided with a longer configuration, which depends on the intended ejection distance for the scattering material to be dispensed. The two parts 12, 13 are joined together in the manner of a tongue-and-groove connection. The front end of the handle part 2 is shaped into a distributor 5. The rear end of the handle part 2, into which opens a transition element of the container 3, which is referred to as an articulated funnel 9, is formed in the lock chamber 4. The lever 11 is pivotably held on the upper part 12. Arc-shaped rails 15 are integrally formed for this purpose on both sides, which rails are used for guiding the lever 11. The lever 11 comprises on each side one respective integrally formed shaped part 14 with an arc-shaped slit 16, into which the rail 15 engages. An actuating controller 17 is further provided on the handle part 2, which control enables a reproducible setting position of the lever 11.

Figure 3:
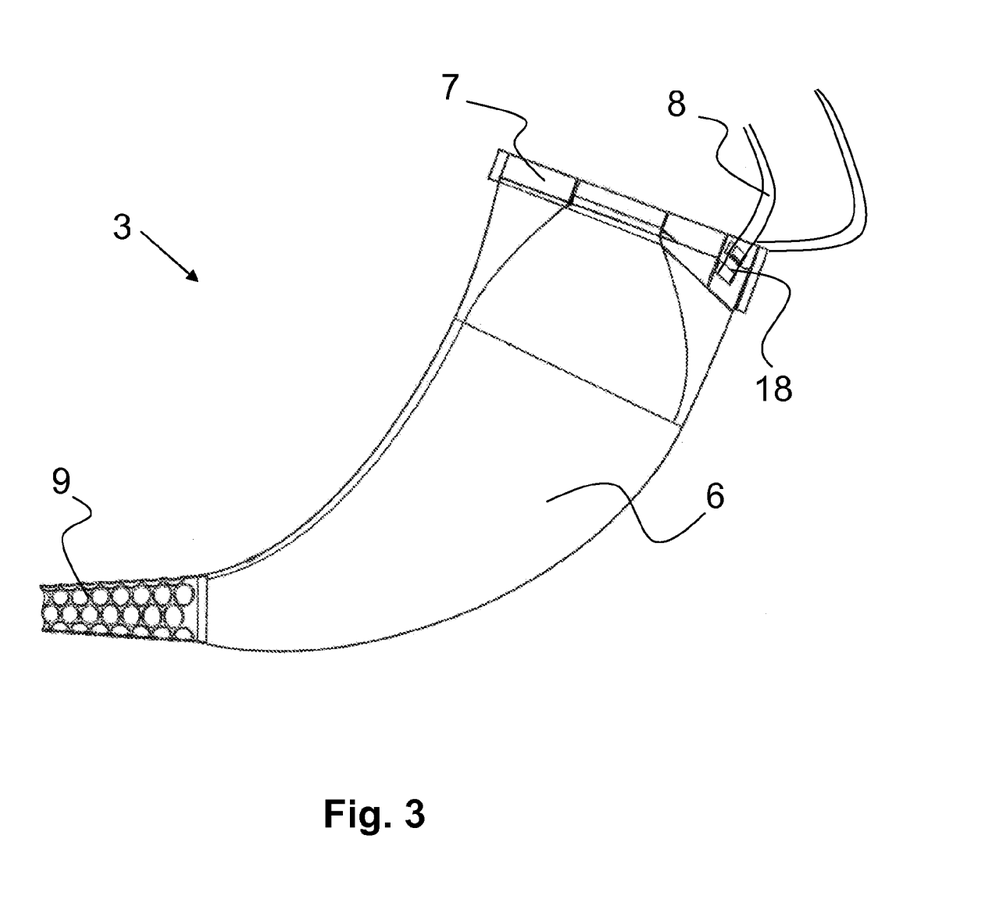
FIG. 3 shows a schematic representation of the container.

Container 3 is schematically shown in FIG. 3. In the described embodiment it consists of a horn-shaped bag 6, which is made of a plastic film, with the closure 7 being arranged at its upper end, with which the bag 6 and the container 3 can be closed off in a sift-proof way. Depending on the field of application, the bag 6 has a capacity of approximately 3 liters to 7 liters, but it is advantageously arranged for economic reasons at a capacity of approximately 5 liters. A strap holder 18 for fastening a carrying strap 8 (only indicated in the drawing) is provided on the closure 7. The bottom end of the bag 6 is connected with the articulated funnel 9, e.g. it is welded, glued, clamped or the like. The articulated funnel 9 consists of a conically formed, flexible and dimensionally stable tubular section made of plastic and its purpose is preventing radial changes in length in case of a longitudinal load. These properties are achieved in that the jacket of the articulated funnel 9 is structured and, for example, has different thicknesses. The length of the articulated funnel 9 is approximately 24 cm, but it can also be shorter or longer by a few centimeters and depend on the shape and the volume of the bag 6.

Figure 4:
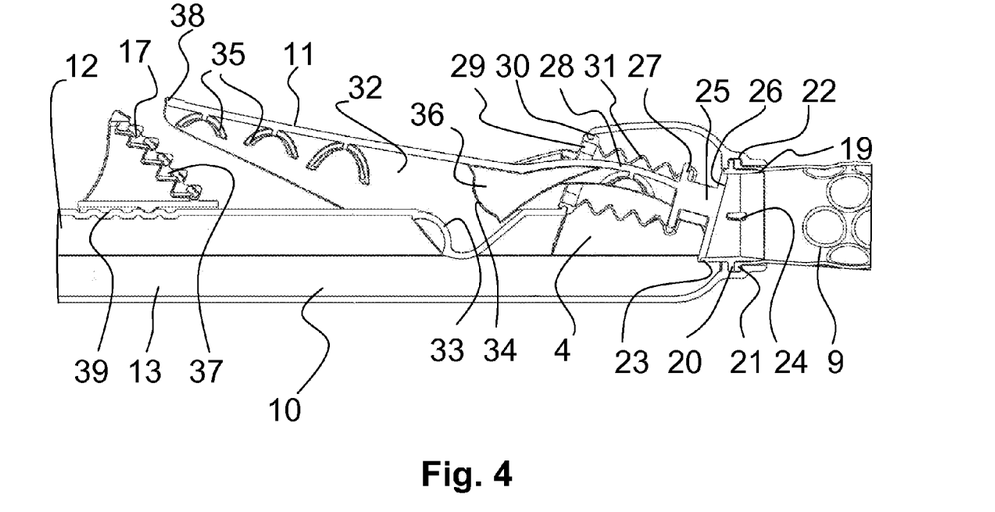
FIG. 4 shows a schematic sectional view of the lock chamber in the handle part.

FIG. 4 shows a schematic sectional view of the handle part 2 in the region of the lock chamber 4. A sleeve 19 is inserted into the articulated funnel 9 of the container 3. The outside diameter of the sleeve 19 is approximately 2.5 cm in the exemplary embodiment. The sleeve 19 comprises in its middle region a collar 20 progressing about the outside circumference. The end of the articulated funnel 9 also comprises a collar 21. The sleeve 19 is inserted to such an extent into the articulated funnel 9 that the collar 20 of the sleeve 19 rests on the collar 21 of the articulated funnel 9 and said two collars 20, 21 jointly form a flange-like connection between the articulated funnel 9 and the sleeve 19. An inwardly extending annular groove 22 is provided in the connecting region of the handle part 2, into which the collar 20 of the articulated funnel 9 and the collar 21 of the sleeve 19 are inserted. As a result, the container 3 is connected with the handle part 2 in a form fit. A releasable connection in the manner of a screwable tubular connection can also be considered instead of said flange connection. The cylindrical sleeve 19 is bevelled at the end disposed in the handle part 2. The obliquely extending edge of the sleeve 20 forms a valve seat 23 for the valve disk 26. The handle part 2 is substantially arranged in a tubular fashion and the valve 25 is arranged at the rear end, into which opens the articulated funnel 9 of the container 3 and which is formed towards the lock chamber 4. The lever 11, which is guided on the outside on the upper part 12 of the handle part 2 in a rail as shown in FIG. 2, opens with an extension (the valve stem 28) into an opening 29 of the lock chamber 4 of the handle part 2. A first collar 27 is arranged at the end of the valve stem 28 and the end of the valve stem 28 is formed by the valve disk 26, which rests on the edge 23 of the sleeve 19 when the valve 25 is closed. As a result, the lever 11 with the valve stem 28 and the valve disk 26 is an integral shaped part 32 in the illustrated embodiment, which comprises reinforcing ribs 35 in sections on its side facing the upper part 12 of the handle part 2. The lever 11, the valve stem and the valve disk can also be individual parts, which are operatively connected with one another via respective joints. The valve stem 28 is enclosed by a rubber bellows 31, the one end of which is pushed over the edge 30 of the opening 29 of the lock chamber 4 and the second end is pushed over the first collar 27 of the valve stem 28. The interior of the lock chamber 4 is thereby tightly sealed off against the outside. When the lever 11 is pressed in the direction of the handle part 2, the lever 11 slides along a circular arc guided by rails disposed externally on the upper part 12. In this process, the valve disk 26 is lifted from the edge of the sleeve 19 (the valve seat 23) and the valve 25 is opened. The bevel of the valve seat 23 in relation to the longitudinal axis of the sleeve 19 is approximately 15°, but can also be greater or smaller by 5° to 10°. When the apparatus 1 is actuated, the handle part 2 is held in such a way that the longitudinal axis of the handle part 2 faces with an angle of approximately 15° to the horizontal against the ground or scattering ground. In this position, the plane of the valve seat is disposed in the vertical. In order to achieve a constant feed of the scattering material to the valve 25, a baffle plate is provided in the sleeve 19. The baffle plate is formed by a web 24, which is arranged in the sleeve 19 transversely to the longitudinal axis and horizontally. When the valve 25 is opened, the direction of movement of the valve disk 26 extends on a circular orbit and the valve disk 26 lifts of from the valve seat 23 in the manner of a tilting movement, in which the pivoting axis lies far outside of the lock chamber 4. As a result, the opening of the valve 25 in the region of the bottom part 13 is slightly larger than in the region of the upper part 12 of the handle part 2. As a result of the expansion of the upper part 12 in the region of the lock chamber 4, in which the valve stem 28 is arranged with the bellows 31 and due to the fact that neither a seal nor an axis or any moved part will protrude into the flow of the scattering material, the scattering material is capable of flowing in an unobstructed manner into the lock chamber 4 when the valve 25 is opened and further into the tubular section 10. The lever 11 will be pressed by a spring, which is not shown in FIG. 4, away from the upper part 12, so that the valve 25 is closed without any actuation of the lever 11. The spring is clamped between the upper part 12, on which an indentation 33 is formed, which indentation is shaped in the manner of a spherical segment, and the reinforcing ribs 36 arranged on the inside of the lever 11 in the longitudinal direction. In order to enable the setting of a reproducible opening of the valve 25, an actuating controller 17 is provided on the upper side 12 of the handle part 2. The actuating controller 17 engages into rails, which are arranged in the longitudinal direction on the handle part 2 and is thereby displaceable in the longitudinal direction. The side of the actuating controller 17, which faces the handle is stepped. Depending on the position of the actuating controller 17, the front edge 38 of the lever 11 rests on one of the steps 37 of the actuating controller 17. An undulating portion 39 is arranged between the actuating controller 17 and the surface of the upper part 12 of the handle part 2, so that during the latching of the actuating controller 17 in a specific undulating portion during the actuation of the lever 11 its front edge 38 will respectively come to lie on the same step 37 of the actuating controller 17, thereby enabling a defined opening of the valve. When the actuating controller is moved to the rearmost position, the front edge 38 of the lever 11 rests on the highest step 37. The height of this step is chosen in such a way that the valve 25 is closed. As a result, this position of the actuating controller 17 acts as a lock for the valve 25.

Figure 5:
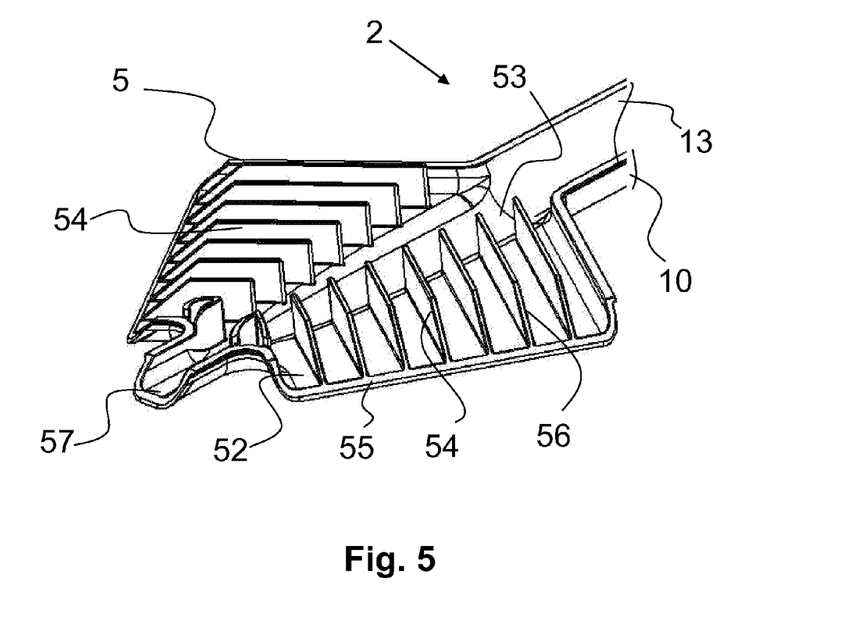
FIG. 5 shows a schematic representation of the bottom part of the distributor.

The front part of the handle part 2 is formed into a distributor 5. FIG. 5 shows the distributor 5 in a schematic representation of the bottom part 13 of the handle part 2. The middle section 10 of the handle part 2 substantially corresponds to a cylindrical tubular section, which opens into the distributor 5. The distributor 5 has a deltoid-shaped base plate 52, which comprises in the longitudinal direction a depression 53, which tapers in the forward direction. Said depression 53 is substantially the continuation of the tubular configuration of the handle part 2, which ends in an outlet 56. Perpendicular ribs are arranged to the side of the depression 53 on the right and left, which ribs extend forwardly under an angle of approximately 55° with respect to the longitudinal axis of the handle part 2. This angle can also be slightly larger or smaller, but should lie between 45° and 65° in order to achieve optimal distribution of the scattering material. The ribs are shorter towards the front and respectively reach on the base plate 52 up to its outside edge 55. The upper part 12 of the handle part 2 is provided with the same geometrical shape in the region of the distributor and forms the cover of the distributor 5 there. The outside dimensions are slightly smaller than those of the base plate. The ribs 54 on the cover reach up to its outside edge. This leads to a bevel 56 of the ribs on their outside edges. The end 57 of the distributor 5 is formed into an outlet. In the preferred embodiment, the distributor 5 is provided with seven respective ribs 54 on the left and right. The number is not limited to seven however. The number can be larger smaller or smaller depending on the size of the distributor.

When the scattering material is dispensed, the granular material reaches the distributor 5 via the lock chamber 4 and the middle piece 10. As a result of the ejection movement performed by hand during dispensing, the granular material will be accelerated and will meet the ribs 54 depending on the direction of ejection when flowing through the distributor 5, it will be deflected by said ribs and be guided and ejected to the outside. In the case of a low flow speed (e.g. when the handle part 2 is held downwardly without any ejection movement) the scattering material will only flow out of the outlet 57. As a result, fertiliser or other scattering material can be dispensed in an entirely purposeful way and also in small quantities.

Figure 6:
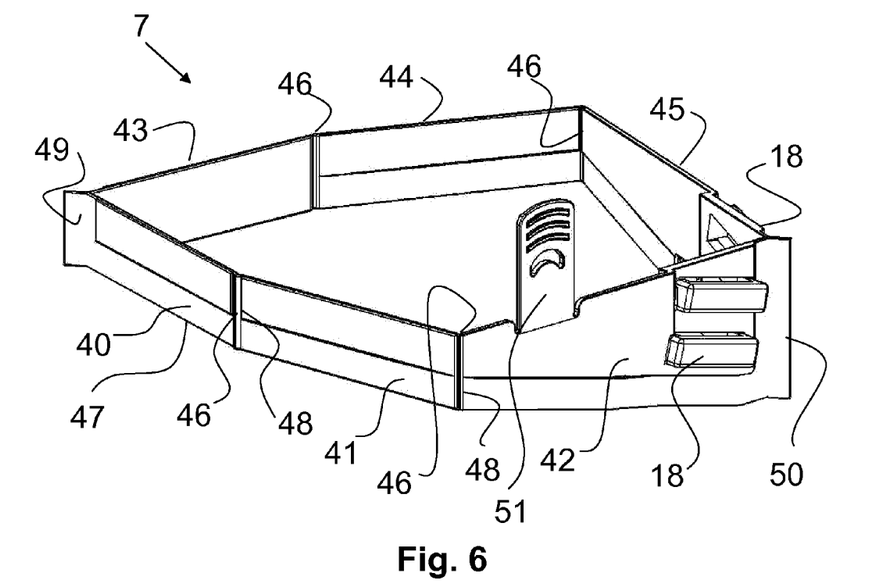
FIG. 6 shows the closure of the bag-like container.

FIG. 6 shows the closure 7 of the bag 6 and the apparatus 1 as shown in FIG. 3. The closure 7 principally consists of six strip-like elements (40 to 45), which are connected with one another at their narrow sides 48. The elements that are connected with each other in this manner form a hexagon. The bottom edges 47 of the elements (40 to 45) are rigidly connected with the bag 6, e.g. they are welded or glued together. By folding the elements 40 to 45 together along their narrow sides 48, the upper edge of the bag 6 will be folded together and can be closed off by means of a clamp or clip. In order to achieve simple opening and closing and folding of the elements 40 to 45 of the closure in the same sequence, two elements 40, 43 are welded together on their common narrow side 49. Similarly, their respective opposing elements 42, 45 are connected with each other on their common narrow side 50, e.g. they are welded or glued together. The other elements are connected with one another on the narrow sides 48 by means of film hinges 46. When the closure 7 is held on the welded narrow side 49, 50 for folding and the two front elements 40, 43 are pressed together, the two insides of the first two elements 40, 43 come to rest on of one another, wherein the narrow sides of the subsequent elements 41, 44 also come to rest on each other. When the two elements 40, 43, which rest together are pushed in the direction of the centre of the closure 7, the outside surfaces of the middle elements 41, 43 come to lie on the outside surfaces of the first elements 40, 43 and the bag begins to close. When seen from above, the edges of the elements 42, 45 form a large V, which encloses a W, which is enclosed by the elements 44, 43 and 40, 41. When the partly folded elements are further pushed in the direction of the third elements 42, 45, the insides of the middle elements 41, 43 come to rest on the insides of the third elements 42, 45 and the closure 7 is thereby folded together and the bag is closed. In the illustrated embodiment, the narrow sides of the third elements have different lengths. A strap holder 18 is arranged in addition to the weld seam 50 on the element 42, 45, which strap holder is used for fixing a carrying strap. Furthermore, a bracket 51 is provided on one of the two third elements 42, with which the closure 7 can be fixed in the folded state by suspension in a respective bracket clamp on the other third element 45. For opening and filling the bag, the bracket 51 is pressed out of the bracket clamp and pulled on the two weld seams 49, 50. As a result, the elements 40 to 45 will move apart and the bag is opened. The elements are differently long in practice. Their size is based on the thickness of the elements 40, 45, the material of the bag and the hinges. The film hinges 46 are arranged on the connection of the first elements 40, 43 with the middle elements 41, 44 on the outside, and on the connection of the middle elements 41, 44 with the third elements 42, 45 on the inside. The bag, which is folded together with the described closure 7 is sealed in a sift-proof way, which means that no granular material will flow from the bag, even when it is held with the closure facing downwardly. It can be advantageous for highly fine-grained granular material such as de-icing salt when additional sealing means are provided on the upper edge of the elements 40 to 45. These sealing elements can be a structured surface of the element 40 to 45, thin strips made of coarse material, which are glued on, or a slightly protruding edge, which engages into a recess on the contacting element. The closure 7 can also be arranged of six individual elements 40 to 45, which are held together on their narrow sides by means of a hinge-like connection. It is also possible that an integral shaped part is produced with six side walls, which form the elements 40 to 45. The hinge-like connection of the elements 40 to 45 is then produced by the thin parts between the individual sections.

The described scattering apparatus can dispense grainy material of virtually any size without any problems and without any major effort in an even manner. The user will come into contact with the scattering material only to a very minute extent. The highly versatile apparatus allows easy dispensing of de-icing salt on roads and paths as well as fertilizer, pesticides and the like in difficult areas in the terrain and on the ground and beneath bushes and shrubs or on side slopes.

The invention claimed is:

1. A portable scattering apparatus for storing and dispensing granular material, comprising:
   a closable container;
   a handle part connected to the container for dispensing the granular material, wherein the handle part comprises a lock chamber for regulating flow of the granular material in a connecting region of the container, and is formed into distributor at a front end; and
   a single valve arranged in the lock chamber,
   wherein the valve can be actuated via a lever, with the lever being pivotably held on the outside of the handle part, and connected via a single valve stem with a single valve disk of the valve, wherein the handle part and the container are connected by a form fit connection of a cylindrical sleeve inserted into the handle part, and wherein the cylindrical sleeve is bevelled at an end disposed in the handle part to provide a bevelled edge that forms a valve seat.

2. The scattering apparatus according to claim 1, wherein the lever opens with an extension forming the valve stem into an opening of the lock chamber of the handle part, and wherein the valve disk is integrally formed on the end of the valve stem.

3. The scattering apparatus according to claim 2, wherein the valve stem is enclosed by a rubber bellows, a first end of the bellows being pushed over an edge of an opening of the lock chamber and a second end of the bellows being pushed over a first collar arranged on the valve stem.

4. The scattering apparatus according to claim 3, wherein the handle part is composed of an upper part and a bottom part, wherein the scattering apparatus further comprises an arc-shaped rail integrally formed on each side of the upper part of the handle part, and wherein the lever comprises on each side an integrally formed shaped part with an arc-shaped slit into which the rail engages.

5. The scattering apparatus according to claim 4, further comprising an actuating controller arranged on the handle part, wherein the controller enables a reproducible setting position of the lever.

6. The scattering apparatus according to claim 1, wherein the container is formed by a bag and a conically shaped flexible and dimensionally stable articulated funnel, and wherein the bag is connected with the articulated funnel.

7. The scattering apparatus according to claim 1, further comprising a web arranged within the cylindrical sleeve and transversely to a longitudinal axis of the cylindrical sleeve, wherein the web extends parallel to a longitudinal extension of the handle part.

8. The scattering apparatus according to claim 1, wherein the valve seat is movable along a circular path having a center point of rotation placed outside of the lock chamber and outside the valve seat.

9. The scattering apparatus according to claim 1, wherein the lever is arranged so that an end that is remote from the valve seat is directed toward the distributor.

10. A portable scattering apparatus for storing and dispensing granular material, comprising:
    a closable container;
    a handle part connected to the container for dispensing the granular material, wherein the handle part comprises a lock chamber for regulating the flow in a connecting region of the container, and the handle part is formed into distributor at a front end; and
    a single valve arranged in the lock chamber,
    wherein the valve can be actuated via a lever, with the lever being pivotably held on the outside of the handle part, and connected via a single valve stem with a single valve disk of the valve, wherein the bottom part of the handle part is formed into a deltoid-shaped base plate in a region of the distributor, which base plate comprises a depression tapering in a longitudinal direction to the front, and wherein perpendicular ribs are arranged adjacent to the depression on the right and left, which ribs extend under an angle of approximately 55°+/−10° with respect to a longitudinal axis of the handle part towards the front, and wherein the ribs are shorter towards the front and reach up to the outside edge of the base plate.

11. The scattering apparatus according to claim 10, wherein the upper part of the handle part in the region of the distributor has the same geometrical shape as the base on the bottom part and forms a cover of the distributor.

12. The scattering apparatus according to claim 10, wherein all outer edges of the ribs are bevelled.

13. A portable scattering apparatus for storing and dispensing granular material, comprising:
    a closable container;
    a handle part connected to the container for dispensing the granular material, wherein the handle part comprises a lock chamber for regulating the flow in a connecting region of the container, and the handle part is formed into distributor at a front end;
    a single valve arranged in the lock chamber; and
    a closure of the container, said closure consisting of six strip-like elements having narrow sides on which said elements are movably connected to each other, wherein bottom edges of said elements are rigidly connected with the bag,
    wherein the valve can be actuated via a lever, with the lever being pivotably held on the outside of the handle part, and connected via a single valve stem with a single valve disk of the valve.

14. The scattering apparatus according to claim 13, wherein the closure is produced from an integral shaped part with six side walls, which form the elements, with thin places between the individual elements forming hinge-like connections of the elements.

15. The scattering apparatus according to claim 13, wherein two elements are welded together on a common narrow side, wherein opposing elements are also welded together on a common narrow side, and wherein the connection on the remaining narrow sides of the elements occurs by means of film hinges.

16. The scattering apparatus according to claim 13, wherein one respective strap holder is arranged on outer sides of two adjacent elements.

\* \* \* \* \*